K. ROMSTAEDT.
AIR VESSEL FOR WATER SUPPLY PIPES.
APPLICATION FILED OCT. 3, 1907.
942,666.
Patented Dec. 7, 1909.
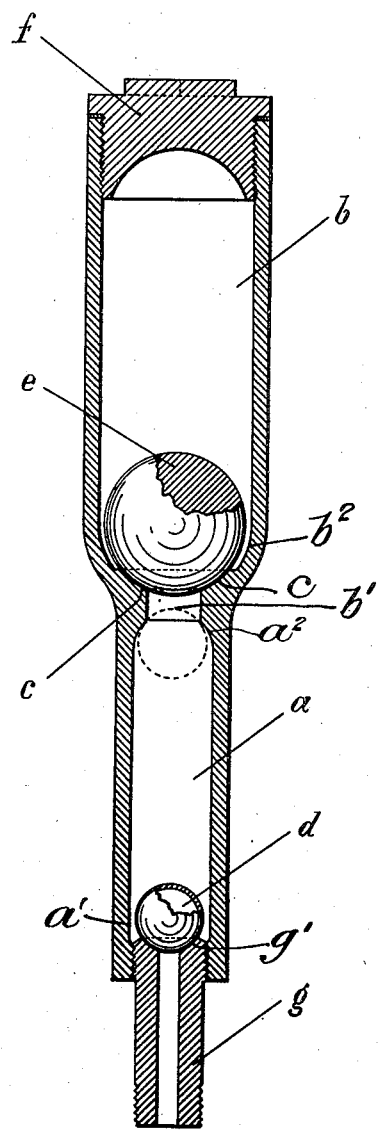

UNITED STATES PATENT OFFICE.

KARL ROMSTAEDT, OF BERLIN, GERMANY.

AIR VESSEL FOR WATER-SUPPLY PIPES.

942,666.    Specification of Letters Patent.    Patented Dec. 7, 1909.

Application filed October 3, 1907. Serial No. 395,751.

*To all whom it may concern:*

Be it known that I, KARL ROMSTAEDT, a subject of the Emperor of Germany, residing at Berlin, Krautstrasse 52, in the Empire of Germany, have invented certain Improvements in Air Vessels for Water-Supply Pipes, of which the following is a specification.

This invention relates to improvements in shock absorbers for water pipe systems for neutralizing the concussion resulting from water hammers and the sudden shutting off of valves so as to relieve the piping system of the strain resulting therefrom.

The invention will be more fully described in connection with the accompanying drawing and will be more particularly pointed out in and by the appended claims.

The drawing illustrates a vertical longitudinal section of a shock absorber embodying the main features of my invention.

As shown the device of my invention comprises a casing in which is formed a lower chamber $a$, relatively restricted in size, and connected with and communicating with a pipe $g$ which may form an extension of a service pipe or a connection with the piping system in any desirable manner, not herein shown. The casing is also provided with a chamber $b$, which is preferably disposed in superposed relation with respect to the chamber $a$ and which is preferably enlarged somewhat with respect to the chamber $a$. The chamber $b$ is in communication with the chamber $a$, at its lower end, and at its upper end the chamber $b$ is closed by the plug $f$.

It will be seen from the foregoing that both chambers are completely closed except at the point of communication with each other and with the pipe $g$. The chamber $b$ communicates with the chamber $a$ through an opening $b'$ which is relatively restricted with respect to the diameter of either of the chambers $a$ or $b$ and around which is formed a valve seat $c$. The wall of the chamber is off-set outwardly at $b^2$ from the valve seat $c$ as clearly shown. A valve seat $g'$ is provided and is conveniently formed on the upper end of the pipe $g$. The pipe $g$ has threaded connection with the walls of the chamber $a$ and the latter is somewhat larger than the exterior diameter of the pipe $g$ so as to afford a space $a'$ similar to the space $b^2$. A valve $e$ is provided in the chamber $b$ and seats loosely upon a valve seat $c$ while a valve $d$ is provided in the chamber $a$ seated loosely upon the valve seat $g'$. Both of the valves $e$ and $d$ are herein shown as spherical in form and each of said valves is heavier than an equal volume of water so that said valves will sink in the chambers and always automatically seat in the manner shown in the drawing. The opening $b'$ adjacent the chamber $a$ is provided with a valve seat $a^2$ upon which the valve $d$ seats when in the position shown in dotted lines.

The operation is as follows:—In order that the device may be made sensitive to the slightest disturbance in the water pipe it should be noted that the ball valve $d$ is hollow and therefore lighter relatively in proportion to its size than the ball valve $e$, yet its specific gravity exceeds that of water, therefore it is more readily responsive to any increase of pressure of the water supply. The two valves $d$ and $e$ are not intended to be tight fitting but should permit the passage of air and water in a limited volume, their office being more especially to retard the movement of air and water into and out of their respective air chambers $a$ and $b$.

The pressure in the pipe causes the water to rise in the chambers of the device until the air pressure therein equals or sustains the pressure of the water in the pipe. Upon opening the outlet valve the pressure in the pipe relaxes permitting the expansive power of the air in the chambers $a$ and $b$ to force the water out, but upon the sudden closing of the outlet valve the water will again rush back into the chambers lifting the valves $d$ and $e$, and as these valves again fall back into their seats they retard the outflow of water and prevent continued pulsations in the pipe, the water gradually flowing out around the valves until the pressure becomes normal or equalized in the chambers and pipe. In this manner the action of the two valves $d$ and $e$ in yieldingly checking the upward thrust of the sudden pressure, then in a measure barring the way of escape from their respective air chambers of the air and water therein, breaks the force of the concussion in both directions. When only a slight concussion occurs the chamber $a$ alone will be sufficient to overcome the disturbance but in the more powerful concussions the chamber $b$ will act as an auxiliary air cushion in conjunction with the air chamber $a$.

I claim:—

1. A shock absorber for water supply pipes comprising in combination, a relatively restricted elongated closed chamber adapted to communicate with a supply pipe, a gravity acting ball valve heavier than water and serving to normally close communication between said chamber and said pipe, an elongated closed chamber superimposed on and communicating with said first mentioned member and relatively enlarged with respect thereto, and a gravity acting ball valve heavier than water and of greater weight than said first mentioned valve and normally closing communication between said chambers.

2. A shock absorber for water supply pipes comprising in combination, a closed chamber adapted to communicate with the supply pipe, a gravity acting ball valve heavier than water and serving to normally close communication between said chamber and said pipe, a closed chamber superimposed on and communicating with said first mentioned chamber, and a gravity acting ball valve heavier than water and of greater weight than said first mentioned valve and normally closing communication between said chambers.

In testimony whereof I affix my signature in presence of two witnesses.

KARL ROMSTAEDT.

Witnesses:
HENRY HASPER,
WOLDEMAR HAUPT.